(12) United States Patent
Himsworth

(10) Patent No.: US 12,436,177 B2
(45) Date of Patent: Oct. 7, 2025

(54) Rydberg RADIO SENSOR

(71) Applicant: THE SECRETARY OF STATE FOR DEFENCE, Salisbury (GB)

(72) Inventor: Matthew David Himsworth, Salisbury (GB)

(73) Assignee: The Secretary of State for Defence, Salisbury (GB)

( * ) Notice: Subject to any disclaimer, the term of this patent is extended or adjusted under 35 U.S.C. 154(b) by 151 days.

(21) Appl. No.: 18/556,985

(22) PCT Filed: Mar. 9, 2022

(86) PCT No.: PCT/IB2022/052088
§ 371 (c)(1),
(2) Date: Oct. 24, 2023

(87) PCT Pub. No.: WO2022/238767
PCT Pub. Date: Nov. 17, 2022

(65) Prior Publication Data
US 2024/0210457 A1    Jun. 27, 2024

(30) Foreign Application Priority Data
May 12, 2021    (GB) ...................................... 2106991

(51) Int. Cl.
*G01R 29/08*    (2006.01)
(52) U.S. Cl.
CPC ..... *G01R 29/0885* (2013.01); *G01R 29/0814* (2013.01)
(58) Field of Classification Search
CPC ............ G01R 29/0885; G01R 29/0814; G01R 29/0871; G01R 29/0864; G01R 27/32
(Continued)

(56) References Cited

U.S. PATENT DOCUMENTS 11,789,095 B2 * 10/2023 Saito ...................... G01R 1/203
324/252
2017/0234913 A1 * 8/2017 Yao ...................... G01R 15/246
324/96
(Continued)

FOREIGN PATENT DOCUMENTS

| CN | 106501624 B | 12/2018 |
|----|----|----|
| CN | 109142891 A | 1/2019 |

(Continued)

OTHER PUBLICATIONS

International Patent Application No. PCT/IB2022/052088, International Preliminary Report on Patentability mailed Nov. 23, 2023, 8 pages.
(Continued)

*Primary Examiner* — Christopher P McAndrew
(74) *Attorney, Agent, or Firm* — Kilpatrick Townsend & Stockton LLP

(57) ABSTRACT

A Rydberg sensor for detecting radio signals has a Rydberg vapour cell and input and output units for probe and control laser beams, where the input and output units split respective input laser beams into respective arrays to intersect oppositely within the vapour cell. The input and output units each contain an array of beamsplitters which preferably have successively increasing splitter ratio along the array, and preferably the beamsplitters are prisms arranged to abut one another and which are bonded to each other and to the vacuum cell to provide resilience to vibration in use. Data or signals from a respective array of photodetectors are passed to a computer processor to measure and discriminate an incident radio signal, for example at a specific frequency and incident angle, in preference to others.

18 Claims, 3 Drawing Sheets

(58) Field of Classification Search
USPC .......................................................... 324/96
See application file for complete search history.

(56) References Cited

U.S. PATENT DOCUMENTS

| | | | |
|---|---|---|---|
| 2019/0187198 A1 | 6/2019 | Anderson et al. | |
| 2023/0358795 A1* | 11/2023 | Varel | H04B 17/11 |
| 2023/0400492 A1* | 12/2023 | Xu | G06N 10/40 |

FOREIGN PATENT DOCUMENTS

| | | | |
|---|---|---|---|
| CN | 208488537 U | 2/2019 | |
| CN | 111929622 A | 11/2020 | |
| CN | 112484666 A | 3/2021 | |
| EP | 4277166 A1 * | 11/2023 | H04B 10/60 |

OTHER PUBLICATIONS

United Kingdom Patent Application No. GB2106991.9, Combined Search and Examination Report dated Jul. 20, 2021, 4 pages.
International Patent Application No. PCT/IB2022/052088, International Search Report and Written Opinion mailed Jun. 27, 2022, 14 pages.
United Kingdom Patent Application No. GB2204872.2, Search Report dated Sep. 27, 2022, 4 pages.

* cited by examiner

Rydberg RADIO SENSOR

The invention relates to the field of Rydberg sensors for detecting, measuring or sensing radio waves.

Rydberg sensors have been proposed for detecting radio waves as they offer improved sensitivity over conventional radio antennas, and are sensitive to an extremely broad range of frequencies of from DC (constant voltage) up to several THz, and can also be extremely finely tuned to be sensitive to a very narrow frequency.

Is desired to provide a compact and robust radio wave detector capable of discriminating radio waves from a predetermined direction, and benefitting from a wide frequency sensitivity range, and high frequency specificity.

According to an aspect the invention provided a Rydberg sensor as set out in claim 1.

This has the advantage that radio waves can be discriminated at a wide frequency sensitivity range, and high frequency specificity, and also is compact and robust and able to discriminate radio waves from a predetermined direction. The combination of physical robustness and compactness is achieved by using opposed arrays of lasers across a Rydberg vapour cell, and generating the opposed arrays using two rows of beam splitters (rather than for example a single splitter to split one laser in to a fan of individual beams, a wide contiguous beam spanning a range of positions along a single Rydberg cell, a bifurcating chain of splitters, an array of lasers, or indeed an array of Rydberg sensor units each with their own lasers which would be a less sophisticated approach).

The maximum wavelength the sensor could determine an angle of, would correspond to its half wavelength equaling the length of the vapour cell. The minimum wavelength would correspond to its half wavelength equal to the minimum separation of any two of the parallel beams. In practice making the (centres of the) beams closer together than 1 mm would be very technically challenging due to diffraction caused by the various optical components, which limits the minimum wavelength to 2 mm which corresponds to the millimetre radio band or 100 GHz however with suitable engineering to achieve very narrow beams, 1 THz could be achieved. By contrast a 6 m long array (which would generally require multiple separate vapour cells) could detect the incident angle of a frequency as low as 100 MHz. The term radio frequencies herein covers at least about 10 MHz to 1 THz, preferably includes up to 10 THz.

According to a second aspect the invention provides a Rydberg sensor unit, comprising the Rydberg sensor of the first aspect and the two input lasers as set out in the last claim.

According to one embodiment the first and/or second row, the beam splitting ratio of the beam splitters regarding the proportion of laser light directed to the Rydberg vapour cell, increases from the input end along the row. Alternatively or additionally in the first and/or second row an optical filter is provided for an output path of each beamsplitter to the vapour in the Rydberg vapour cell, and the optical density of these filters decreases from the input end along the row. Note that these could be absorption filters, or could be partial mirrors to deflect some of the light either back or away. This has the advantage of enhancing the performance of the sensor by enabling the sensor beams along the row(s) to be more uniform in intensity. Preferably the beams have respective intensities entering the Rydberg vapour cell where the highest intensity is no more than 200% of the lowest intensity one, and preferably no more than 130%, preferably no more than 110%. Substantially equal intensities has been found to be optimal for improving signal to noise ratio and sensitivity of the sensor. The first and/or the second row of beamsplitters preferably comprises (indeed preferably all of the beamsplitters in the first and/or second rows are) non-polarising beamsplitters but it is not essential for them to be non-polarising.

Optionally the optical filters are partial optical reflectors, arranged to reflect a proportion of the light back. Especially when combined with additional reflective elements, such as at an opposite side of a beamsplitter, this can contribute to some of the blocked light being passed back into and along the row of beamsplitters, to emerge via one of the other beamsplitters further along. This is advantageous as it promotes efficient use of the laser energy.

Optionally the probe laser beam has a wavelength of from 100 nm-900 nm, preferably from 550-900 nm.

More generally, one of the lasers may be arranged to operate with a wavelength of from 700 to 900 nm, and the other with a wavelength of from 300 to 600 nm.

According to one embodiment in the first and/or second, the beam splitters are each provided by a planar interface within a solid transparent body, in each case the planar interface being arranged diagonally with respect to laser input direction from the respective laser input port. This has the advantage of even greater robustness such that the components have less tendency to move when the sensor is subjected to acceleration or vibration, leading to greater signal to noise ratio and sensitivity.

Preferably in the row(s) of solid beamsplitters, each beam splitter is provided by a pair of substantially triangular optical prisms defining their respective diagonal planar interface between them. This further enhances the robustness of the device.

Optionally the Rydberg sensor of claim 5 wherein in the row(s) of solid beamsplitters, two of the substantially triangular optical prisms of two adjacent beam splitters are provided by a common parallelogram shaped optical prism. This has the same advantage of triangular optical prisms but reduces the number of optical interfaces that the light passes through, and the reflections that these cause, and further enhances the robustness of the sensor to acceleration and vibration.

Generally the row(s) of solid beamsplitters, the optical prisms are stacked to rigidly abut one another along the row. This enhances the robustness of the sensor, although an alternative is to house each beamsplitter in a mount, and to have the mounts abut each other, or indeed to use only one unitary mount for the whole row.

Preferably, in the row(s) of solid beamsplitters, the optical prisms are bonded to one another along the row. This further enhances the robustness of the sensor.

Preferably, in the row(s) of solid beamsplitters, the optical prisms are bonded to a respective window area of the Rydberg vapour cell. This further enhances the robustness of the sensor.

Preferably, in the row(s) of solid beamsplitters, the optical prisms are integral with a respective window area of the Rydberg vapour cell. This further enhances the robustness of the sensor.

Optionally the coupling laser input unit is provided with optical filters between each of the optical prisms of the row thereof, arranged to transmit light from the coupling laser, but to block light from the probe laser. This avoids light from the probe laser reflecting through two beamsplitters of the coupling laser and impinging on the wrong photodiode.

Optionally, the coupling laser input unit is provided with at least one dichroic beam splitter arranged to direct the probe laser light out of the path of the coupling laser beams, onto the photodiodes without passing through the row of beamsplitters of the coupling laser input unit. This is another way to prevent light from the probe laser reflecting through two beamsplitters of the coupling laser unit and impinging on the wrong photodiode.

Preferably the Rydberg vapour cell comprises a unitary vapour cell exposed to receive all of the at least three probe laser beams at all of the at least three coupling laser beams. This has the advantage of improving the sensitivity of the sensor, since each part of the Rydberg vapour will have substantially the same temperature and pressure.

Preferably the probe laser input unit is arranged to direct a reference probe laser beam to one of the photodetectors of the array of photodetectors without passing through the vapour of the Rydberg vapour cell, or without overlapping with a coupling laser beam within the Rydberg vapour cell. This provides a reference signal which enables more accurate measurement of the absorption of the probe laser beams through the vapour, and improves sensitivity of the sensor.

According to a second aspect of the invention there is provided a Rydberg sensor unit comprising a Rydberg sensor of the first aspect; a probe laser arranged to direct a probe laser beam into the input port of the probe laser input unit; and a coupling laser arranged to direct a coupling laser beam into the coupling laser input port; wherein a predetermined one the two aforesaid lasers are arranged to operate with differing wavelengths; and wherein the coupling laser is adapted to modulate its output intensity in response to a modulation signal, or the coupling laser is provided with a modulator adapted to modulate the intensity of the coupling laser input beam, into the coupling laser input port.

It is also possible to swap those wavelength bands and still achieve a workable device.

According to a third aspect of the invention there is provided a method of measuring a signal using the Rydberg sensor of the first aspect.

Any feature in one aspect of the invention may be applied to any other aspects of the invention, in any appropriate combination. In particular device aspects may be applied to method or use aspects and vice versa. In all aspects, the invention may comprise, consist essentially of, or consist of any feature or combination of features.

Optionally a 2D Rydberg sensor is provided, comprising two of the Rydberg sensors of the type set out herein, arranged such that the individual probe beams of one, are substantially perpendicular to the individual probe beams of the other. This enables greater selectivity in identifying a signal of interest, for example enabling a user to identify a signal from a particular direction in two dimensions (e.g. angle and azimuth) rather than just one. Preferably the probe beams of the two sensors are provided by a single laser, and preferably the control beams of the two sensors are provided by a single laser, and preferably the data or signals from the respective sets of photodetectors are analyzed together by the computer processor rather than being analyzed independently or indeed by separate computer processors. Preferably the two sensors are fixed on a common substrate (e.g. on one circuit board).

Further embodiments are set out in the claims.

BRIEF DESCRIPTION OF THE DRAWINGS

The invention will now be described, purely by way of example, with reference to the accompanying drawings, in which.

DETAILED DESCRIPTION

Figure 1:
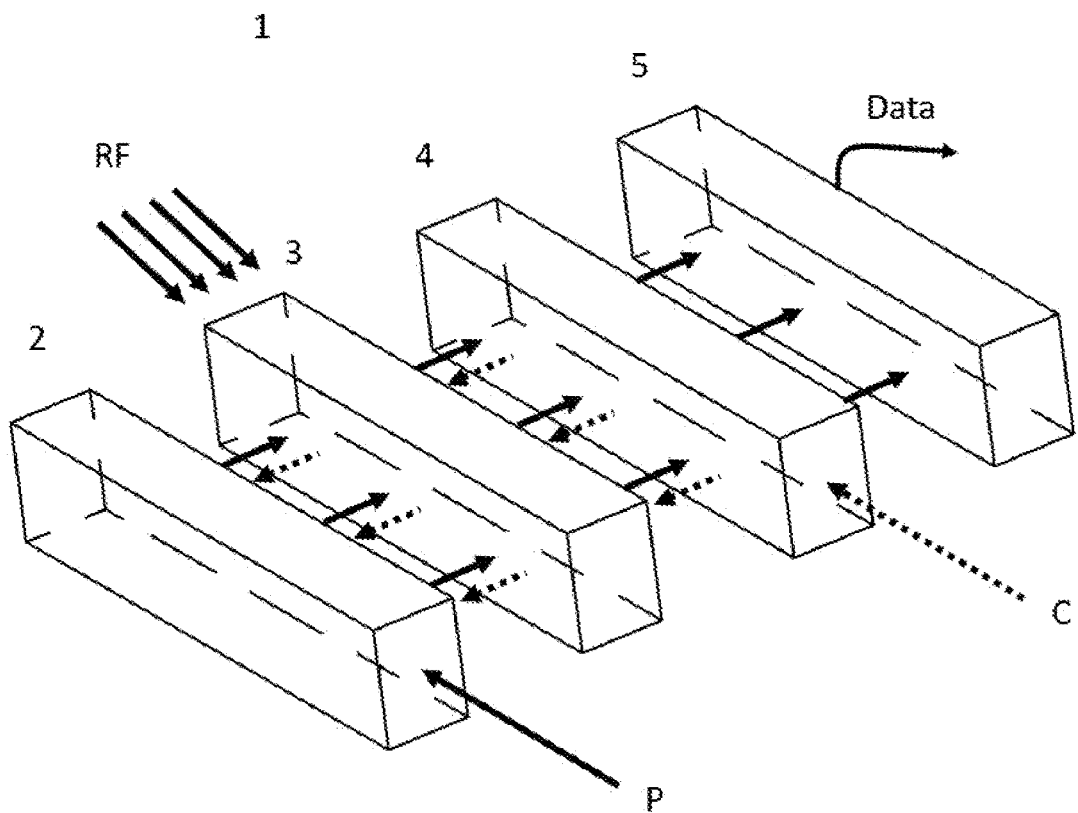
FIG. 1 is an illustration of components of a Rydberg sensor according to an embodiment of the present invention, shown from a perspective angle.

A Rydberg sensor comprises a vapour of Alkali atoms held at low pressure in a cell (typically glass, but can be metal, crystalline, ceramics so long as there is optical access) with optical access ports. Under low (partial vacuum) pressures, the Alkali metals will naturally form a vapour whose density depends on the atomic species and temperature ('the vapour pressure'). At room temperature, Rubidium and Caesium alkali sources attain useful densities such that they produce measurable absorption of a resonant laser beam. Other alkali metals may require some heating (several tens of degrees Celsius above room temperature) to reach suitable optical densities.

The Rydberg state may be reached directly via a high energy single photon (typically with wavelengths between 200 and 350 nm) or by a 'ladder' excitation method in which the atom is excited through several intermediate states. The sum of the energies of each photon within the ladder must be equal to the single photon transition energy. The simplest two transition approach is from the ground state to the first excited state via a dipole transition and from there to an excited Rydberg state near to the ionization energy. The wavelengths of the lasers used in this 2-step ladder transition are typically one in the range 550-1100 nm and another in the 300 to 500 nm range. Rubidium and Caesium are the most common species used and in this example the 2-step ladder transition in Rubidium will be used as an example. One individual laser beam is typically 'weak' (typically <1 mW, preferably <. 1 mW) and called the probe beam, and the opposite individual laser beam is much stronger (typically >1 mW, preferably >10 mW) and is called the coupling laser. The power in the coupling laser is chosen to be high enough to generate a change in transmission of the probe laser through the vapour.

In our example, the probe beam couples the 5S to 5P transition in rubidium with a wavelength of 780 nm, and the coupling laser couples from the 5P to the nS or nD Rydberg states, where n is a integer >5 and typically is in the range 10-100. In our example, the probe and coupling lasers counter-propagate through a vapour cell. The alignment of the beams is generally parallel but should at least be sufficiently close to parallel to avoid or minimise Doppler broadening effects and an unduly reduced signal strength. The coupling beam has the effect of reducing the absorption of the probe beam when both are resonant with the atomic transitions. This effect is known as Electromagnetically Induced Transparency (EIT). Depending on the atom/element chosen, there are hundreds of Rydberg energy levels with spanning the range from kHz to THz, enabling measurement at frequencies from DC (constant voltage) to at least 1 THz, preferably at least 3 THz, preferably at least 10

THz. The external photon radiation (RF) of interest can be in the radio frequency band e.g. 20 kHz to 1 THz, potentially 3 THz, potentially 10 HTz, but is not necessarily so and indeed could be any frequency that the Rydberg atom is sensitive to—e.g. from 0 Hz (DC) upwards. This RF (whether in the conventional radio frequency band or not) couples between the state the Coupling laser is resonant with, and another Rydberg level, the EIT effect is perturbed leading to a change in intensity of the probe laser passing through the cell. Therefore the signal of the probe laser can be used to monitor RF radiation across a very broad spectrum. The atoms act like individual RF mixers because the RF affects the atomic state amplitudes, but detection of the state population is the square of those amplitudes (it is multiplied, or mixed). The above method only measures the amplitude of the RF radiation.

To gain phase information it is necessary to implement what is known as the 'holographic method'. This requires the coupling laser to be modulated at the RF frequency of interest (that couples two Rydberg states). This results in the phase of the coupling laser to change during its propagation through space. When an external RF radiation is added, the interference between that radiation and the different phases of the coupling laser modulation leads to different transmission of the probe laser. If the RF and coupling laser are in phase, then the effect on the probe transmission is amplified, if they are 180 degrees out of phase, the combination of the RF radiation and coupling laser modulation is cancelled, so the probe beam responds as if no external radiation is added. Previous examples of this technique apply a phase modulation by physically alter the path length of the coupling laser, so as to scan through the different phases of the RF signal however this is not essential here.

In an embodiment of the invention, the coupling laser is separated into several distinct beams, each with a (slightly) different path length. Therefore this system effectively provides several (generally at least three, but preferably at least five or at least ten) Rydberg receivers separated in space, typically along one vapour cell or else along respective vapour cells. By monitoring the relative probe transmission of each beam, the RF phase can be mapped out with respect to the physical locations of the vapour being probed at different positions along the vapour cell(s). Any change in incident angle of the external RF will result in a slightly different interference pattern across the cell. This therefore provides a phased array of sensors.

By appropriate choice of modulation frequency and differential measurements of several beams, it is possible to make an antenna with directional gain, and so acts as a spatial and frequency filter. Because the Rydberg receivers are so broadband, this phased array design can be adjusted for any frequency where the (half) wavelength of the RF radiation is between the minimum separation of the two least separated beams, and the separation of the two furthest separated beams. No mechanical change needs to be made to the antenna to cover the whole spectrum, unlike existing technologies.

The phase array antenna can optionally also be sensitive to the polarization of the incoming radiation and can be monitored along orthogonal axes provided that it is monitored along orthogonal axes using respective 1D arrays or 2D array. To allow the sensor(s) to be sensitive to specific RF frequencies that lie between the frequencies corresponding to individual Rydberg states/transitions, it is possible to modulate the probe beam such that a 'super-heterodyne' detection can be made as is known in the art.

Turning to FIG. 1 a Rydberg sensor 1 according to an embodiment of the invention is shown in diagrammatic form from a perspective angle. Probe laser P is fed into a probe beamsplitter unit 2, typically via a fibre optic cable (not shown) and inlet port (not shown) and is split into multiple beams, in this case three beams (solid arrows) which exit the probe beamsplitter 2 as an array of parallel beams, and enter a vapour cell 3 containing an alkali metal vapour at a pressure and temperature enabling the vapour to have a usefully measurable optical density, and typically is a low pressure (below atmospheric pressure) vapour of rubidium or caesium. The vapour cell should be transparent not only to the laser beams at the relevant locations, but also to incident photon radiation (RF) of interest to allow the RF to influence the Rydberg atomic energy states of the vapour.

The probe beams pass through the vapour cell via transparent wall/window(s) and exit via an opposed wall/window(s) having been either attenuated or not attenuated by the vapour, and pass towards an array of photodetectors 5. To reach the photodetectors they may (as is shown in this case) pass through a control beamsplitter unit 2 but preferably these probe beams are prevented from being caused to mix with each other due to that control beamsplitter unit as will be explained later.

At the array of photodetectors 5 the intensity/amplitude of the probe beams are measured and this is fed as data or a signal (Data) to be processed by a computer processor (not shown) to determine information about a photon radiation signal (RF) impinging on the vapour cell (3). The term computer processor includes any electronic device adapted to process signals or data from a phased array of sensors to determine or measure a signal or frequency, and could be a microprocessor or field programmable logic gate array, or phased array signal combining electronics, rather than a computer in the conventional sense.

In addition, a control laser beam C is fed into the control beamsplitter unit 4 typically via fibre optic cable and inlet port (not shown), and split into an array of beams aligned to oppose those of the probe laser so that the two arrays of laser beams overlap as pairs within the vapour in the vapour cell 3. Optionally (not shown) the vapour cell could comprise an array of vapour cells so that two probe laser beams would not pass through the same vapour cell.

Figure 2:
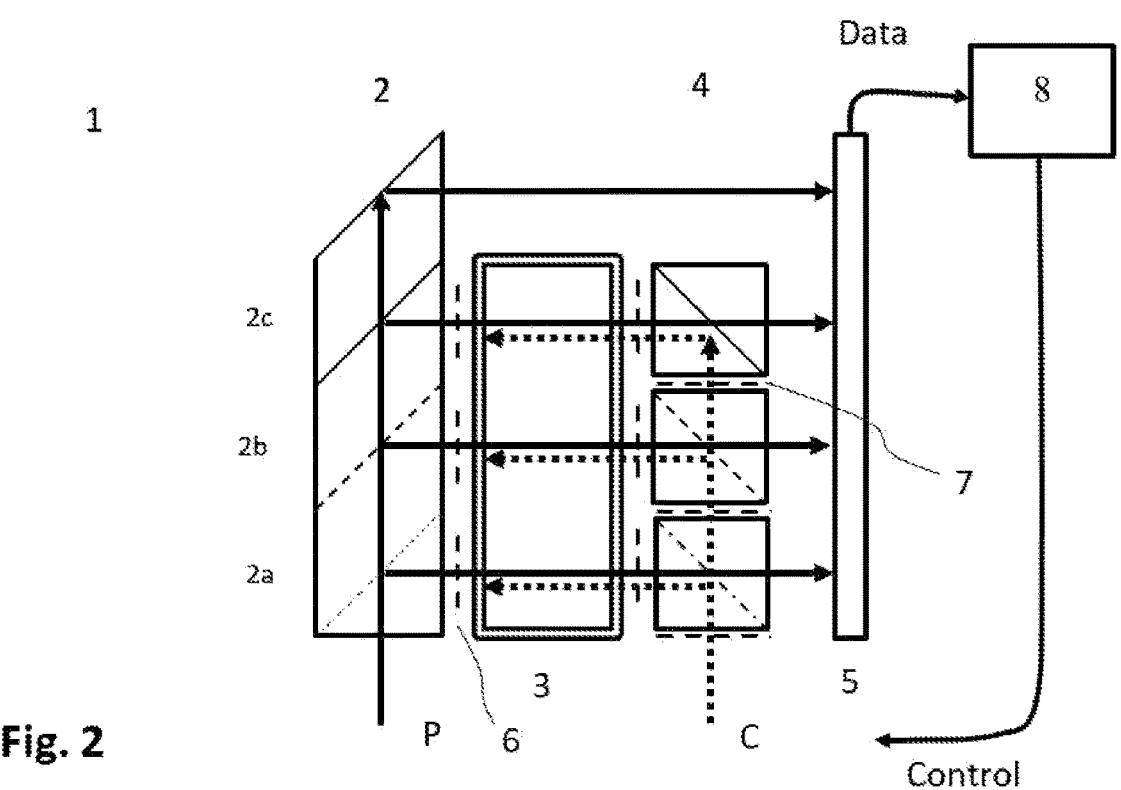
FIG. 2 is a plan view diagram of a Rydberg sensor according to an embodiment of the present invention.

FIG. 2 shows a plan view schematic of an embodiment of the invention. As with FIG. 1, probe laser beam P passes into one end of an elongate beam splitter unit 2, and control laser beam C passes into one end of an elongate beam splitter unit 4 (does not need to be the same end). Each beamsplitter unit 2, 4 comprises an array of beamsplitters therealong, arranged to provide an array with beam intensities that are preferably substantially equal, and beam power that is preferably substantially equal, along the vapour cell, and these beams generally (although not strictly necessarily) exit at a different angle to the inlet, typically at substantially a right angle.

It is possible to have different intensities but this is not usually beneficial and generally the system would normally be designed to provide equal intensities and equal laser beam power along the array. This is achieved by one or both of the following methods—either the array of beamsplitters has different splitting ratio—for example here 4 beams are desired, so the first beamsplitter divides off 25% of the beam, then 33%, then 50%. The distal end of the beamsplitter from the laser inlet can be a beamsplitter or can simply direct all of the remaining laser energy into (typically one end of) the vapour cell. As an alternative (or in addition), some or each beamsplitter(s) may be provided with an optical density filter (vertical dashed lines) either as part of the beamsplitter or as part of a window into the vapour cell or between them, arranged to reduce the intensity of that individual beam. The most efficient method is to have beamsplitters with differing splitting ratios, but since the lasers are relatively low power it may be considered cheaper or simpler to implement optical density filters.

As shown in FIG. 2 the control beamsplitter 4 also comprises an array, in this case also a line of beamsplitters, arranged to redirect inlet control laser C (dotted vertical line) into an array of control laser beams (dotted horizontal lines). Again the beamsplitters may have varying splitter ratio and/or they may have varying optical density filters in the path into the vapour, and generally the control beams entering the vapour cell typically have substantially equal intensities and substantially equal powers, although as mentioned this is not essential and if they have differing intensity and/or power this could be accounted for when processing the data, however preferably one or both of these methods is employed to limit the diversity of intensities and/or powers, since this provides for outputs to the photodiodes that are simpler to process and typically would have more optimal signal strength.

In FIG. 2 an extra beampath for the probe laser is shown which bypasses the vapour cell. This is useful as it provides a reference value so that the optical density of the vapour can be determined more accurately. This beam path is optionally deflected by the probe beamsplitter to be substantially parallel to the others, which facilitates all the photodiodes to be arranged together in one component.

To prevent the probe beams from being mixed by the control beamsplitter unit 4, those beamsplitters are separated by filters 7 arranged to absorb any probe beam energy deflected by any of the beamsplitters of the control beamsplitter unit 4. This is readily straightforward to achieve since the designer of the sensor 1 will have in mind a plan to use particular laser frequencies or ranges thereof for the control and probe laser beams, and thus can include a filter arranged to maximise attenuation of the probe laser beam but to minimise attenuation of the control laser beam.

On arrival at an array of photodiodes 5, the individual probe beams are measured, and these measurements are passed as data or signals (Data) for processing by a computer processor 8. The computer processor evaluates variations in the signals to measure an RF signal at one or more frequencies and/or angles of arrival. This permits for example RF signals from other directions than the one of interest, to be greatly or entirely eliminated.

Further preferably, the computer processor may issue a control signal to the laser(s) to adjust to suitable parameter(s) (e.g. frequencies) for measuring a desired RF frequency, as is known in the art of Rydberg sensor design. The computer processor and lasers optionally form part of the sensor module, or may be provided separately.

The probe beamsplitter unit 2 is formed from parallelogram shaped optical blocks to provide partial reflection minimising the number of optical interfaces and thus minimising back-reflections. By contrast the control beamsplitter unit 4 is formed of separate triangle-pair shaped optical blocks, which has the benefit of providing a natural location for the filters 7 to be placed to prevent mixing of the probe laser beams. Alternatively individual beam splitters in the form of partial mirrors can be arranged however it is preferred to utilise solid optical block type beam splitters as these are robust, and have the benefit that if shaped to abutting one another this facilitates accurately orienting them to have matching orientation and provides for a physically robust system that is less susceptible to vibration than individually mounted partial mirrors.

Generally the components would be mounted on a substrate (not shown).

Figure 3:
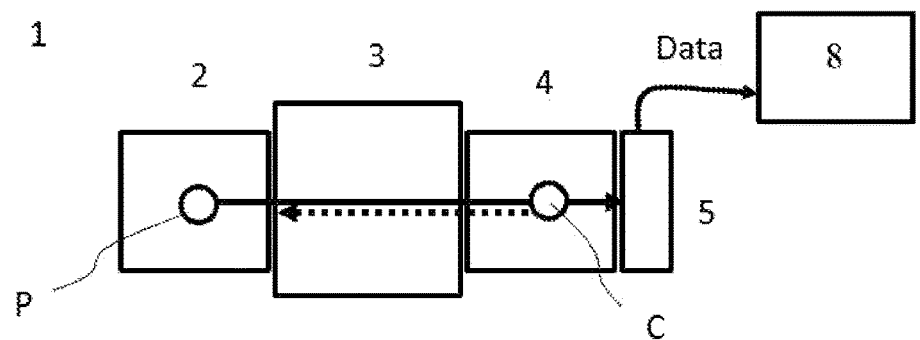
FIG. 3 is an end-view diagram of a Rydberg sensor according to an embodiment of the present invention.
Figure 4:
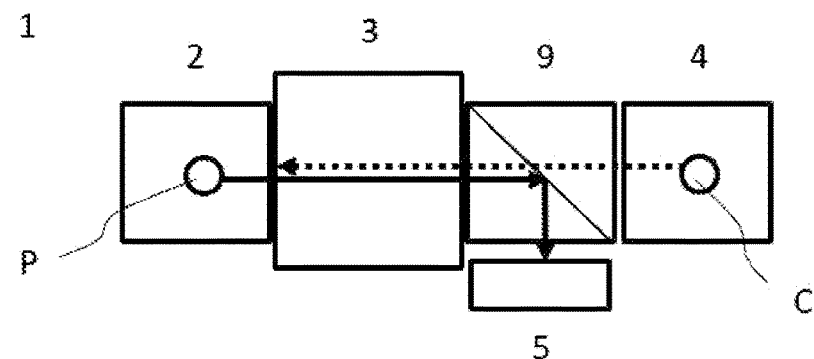
FIG. 4 is an end-view diagram of a Rydberg sensor according to an embodiment of the present invention.

FIGS. 3 and 4 show an end view schematic of Rydberg sensors 1 according to two embodiments of the invention. As with FIGS. 1 and 2, a probe beam P is passed into one end of an elongate probe beamsplitter unit 2, in this case via an inlet port (circle), and a control beam C is passed into one end of an elongate control beamsplitter unit 4 in this case via an inlet port (circle). In the embodiment in FIG. 3, probe beamsplitter 2, vapour cell 3, control beamsplitter 4 and photodiode array 5 are arranged in a row and typically arranged on a planar substrate (not shown). In FIG. 4 an extra beamsplitter component 9 is included to divert the probe laser beams to the photodiode array 5. This avoids the photodiode receiving them after they have passed through the control beamsplitter 4 which helps avoid mixing between the individual probe beams and avoids the need for filters between the individual beamsplitters within the control beamsplitter unit 4. As an alternative in FIG. 4 the locations of photodiode array 5 and control beamsplitter 4 could be swapped.

Figure 5:
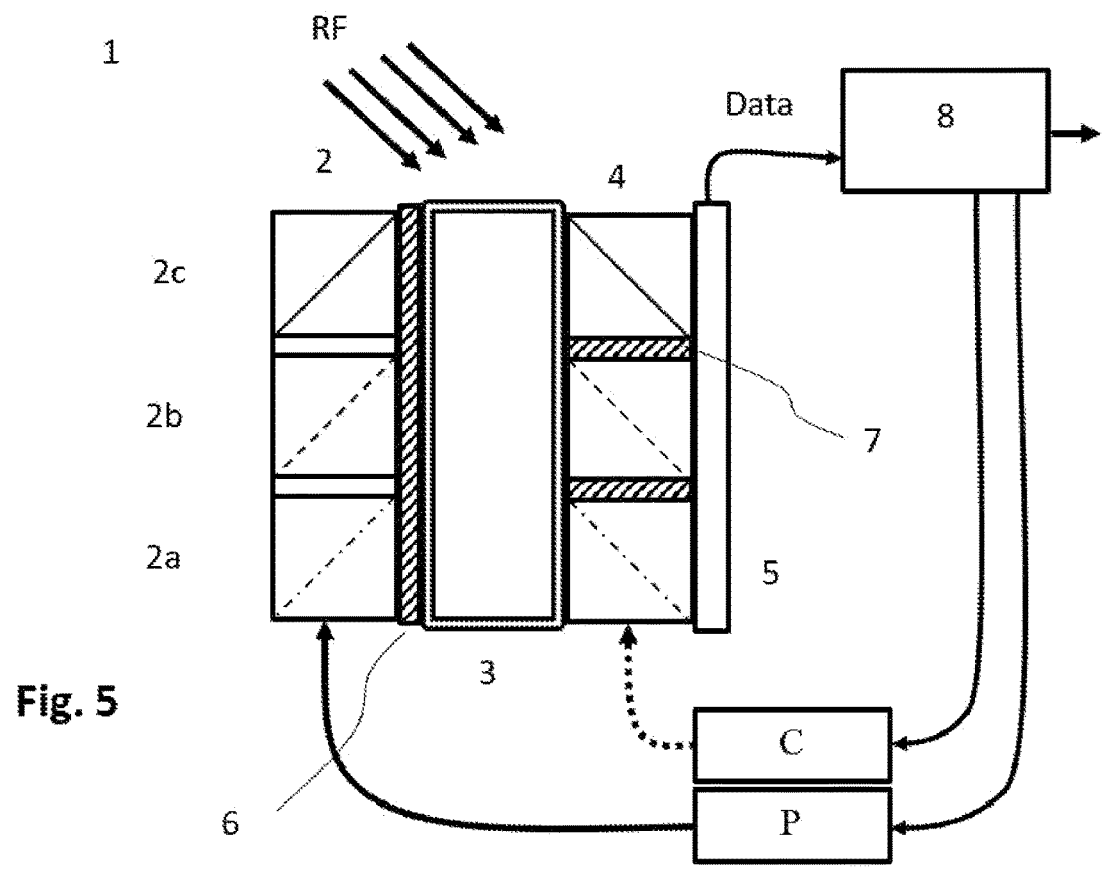
FIG. 5 is a plan-view diagram of a Rydberg sensor according to a preferred embodiment of the present invention.

FIG. 5 shows a preferred embodiment in which the beamsplitters in the probe beamsplitter unit 2 and those of the control beamsplitter unit 4 are solid optical block prisms arrange to have mating surfaces arranged to abut one another (in this case via intermediary optical elements which in the case of the control beamsplitter unit are the optical filters 7). These are bonded together and also are bonded to the sides of the vapour cell 3, and are bonded to the array of photodiodes 5. By arranging the components to have matching abutting surfaces that are bonded together this provides for a physically robust system that is more immune to the effects of vibration in use.

FIG. 5 further shows that the signals/data (Data) is passed to a computer processor 8 which optionally also controls the lasers C, P to provide laser energy with parameters (E.g. frequency) as required for any particular RF measurement task as is known in the art.

Figure 6:
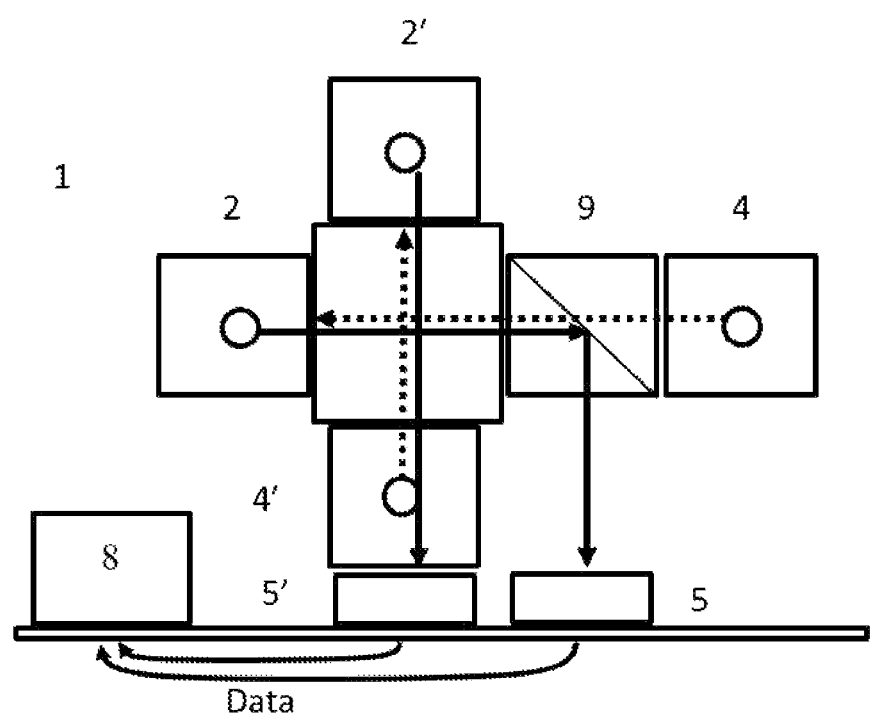
FIG. 6 is an end-view diagram of a 2D Rydberg sensor according to an embodiment of the present invention.

FIG. 6 shows one way to construct a 2D phase array Rydberg sensor according to an embodiment. An elongate Rydberg vapour cell(s) has windows arranged to accept an array of beams from two probe beam splitters 2, 2', and an array of beams from two control beam splitters 4, 4', at substantially right angles. Beams from beamsplitters 2 and 4 typically should not intersect with beams from beamsplitters 2' and 4' and therefore the arrays preferably interleave/interdigitate along the elongate Rydberg cell(s). The probe outputs are passed to respective photodiode arrays 5, 5' and to a computer processor 8 to be processed to determine information about an incoming signal. In this particular arrangement beamsplitter 4' benefits from filters to prevent the probe beam being mixed, whereas beamsplitter 4 doesn't need these since the probe beam is diverted by additional beamsplitter 9.

By use of two substantially orthogonal measurements, the polarisation of an incoming signal can be determined or filtered for, enabling the direction of the incoming signal to be determined or filtered for. Use of beamsplitter 9 facilitates arranging both arrays of photodetectors 5, 5' on the same substrate (e.g. circuit board) and minimises obstruction of the incoming radio signal.

It will be understood that the present invention has been described above purely by way of example, and modification of detail can be made within the scope of the invention.

The invention claimed is:

1. A Rydberg sensor for detecting radio signals comprising:
a detector unit comprising at least one Rydberg vapour cell exposed to receive radio signals incident thereon, and a probe laser input unit and a coupling laser input unit;
wherein the probe laser input unit comprises a first row of beam splitters arranged to accept and direct a probe laser input from a probe laser input port at an input end of the row, into a respective vapour cell window area of the Rydberg vapour cell(s), as an array of at least three probe laser beams;
wherein the coupling laser input unit comprises a second row of beam splitters arranged to accept and direct a phase or frequency modulated coupling laser input beam, from a coupling laser input port at an input end of the row, into a respective vapour cell window area of the Rydberg vapour cell(s), as an array of at least three coupling laser beams;
wherein the two arrays of laser beams are aligned to each other to provide opposed pairs of laser beams, each pair intersecting within the vapour of the Rydberg vapour cell(s) with parallel and opposite beam directions;
wherein for each of the two rows of beam splitters, either:
the beam splitting ratio of the beam splitters regarding a proportion of laser light directed to the Rydberg vapour cell(s), increases from a first beamsplitter thereof to a second beamsplitter thereof, from the input end along the row; and/or
an optical density of optical filters or reflectors associated with respective output paths to the vapour in the Rydberg vapour cell(s) decreases from a first beamsplitter thereof to a second beamsplitter thereof, from the input end along the row;
an array of at least three photodetectors, each arranged to measure a time variation of intensity of laser light from a respective one of the probe laser beams exiting the vapour cell(s) from a vapour cell window area;
wherein the coupling laser input unit is arranged to direct each respective probe laser beam from the Rydberg vapour cell(s) to a respective photodetector of the array such that each photodetector receives light from only one of the probe lasers of the at least three probe laser beams; and
a computer processor and data storage medium arranged to receive data from the photodetectors, provided with instructions to control the computer processor compare their time variation of intensity, to determine a radio signal incident on the vapour cell.

2. The Rydberg sensor of claim 1, wherein in the first and/or second row of beam splitters, the beam splitting ratio of the beam splitters regarding the proportion of laser light directed to the Rydberg vapour cell(s), increases from a first beam splitter thereof to a second beam splitter thereof, from the input end along the row.

3. The Rydberg sensor of claim 1, wherein in the first and/or second row of beam splitters, an optical density of optical filters or reflectors associated with respective output paths to the vapour in the Rydberg vapour cell(s) decreases from a first beam splitter thereof to a second beam splitter thereof, from the input end along the row.

4. The Rydberg sensor of claim 1, wherein in the first and/or second row of beam splitters, the beam splitters are each provided by a planar interface within a solid transparent body, in each case the planar interface being arranged diagonally with respect to laser input direction from the respective laser input port.

5. The Rydberg sensor of claim 4, wherein in the first and/or second row of beam splitters, each beam splitter is provided by a pair of substantially triangular optical prisms defining their respective diagonal planar interface between them.

6. The Rydberg sensor of claim 5, wherein in the first and/or second row of beam splitters, two of the substantially triangular optical prisms of two adjacent beam splitters are provided by a common parallelogram shaped optical prism.

7. The Rydberg sensor of claim 2, wherein in the first and/or second row of beam splitters, optical prisms are stacked to rigidly abut one another along the row.

8. The Rydberg sensor of claim 2, wherein in the first and/or second row of beam splitters, optical prisms are bonded to one another along the row.

9. The Rydberg sensor of claim 2, wherein in the first and/or second row of beam splitters, optical prisms are bonded to a respective window area of the Rydberg vapour cell.

10. The Rydberg sensor of claim 2, in the first and/or second row of beam splitters, optical prisms are integral with a respective window area of the Rydberg vapour cell.

11. The Rydberg sensor of claim 1, wherein the coupling laser input unit is provided with at least one dichroic beam splitter arranged to direct the probe laser light out of the path of the coupling laser beams, onto photodiodes without passing through the row of beam splitters of the coupling laser input unit.

12. The Rydberg sensor of claim 1, wherein the Rydberg vapour cell is a unitary vapour cell exposed to receive all of the at least three probe laser beams and all of the at least three coupling laser beams.

13. The Rydberg sensor of claim 1, wherein the probe laser input unit is arranged to direct a reference probe laser beam to one of the photodetectors of the array of photodetectors either without passing through the vapour of the Rydberg vapour cell, or without overlapping with a coupling laser beam within the Rydberg vapour cell.

14. The Rydberg sensor of claim 1 arranged to discriminate a signal based on frequency and/or incident angle having a frequency of from 100 MHz to 100 GHz.

15. A 2D Rydberg sensor comprising two of the Rydberg sensors as set out in claim 1, arranged such that the individual probe beams of one, are substantially perpendicular to the individual probe beams of the other.

16. A Rydberg sensor unit comprising:
the Rydberg sensor according to claim 1;
a probe laser arranged to direct a probe laser beam into the input port of the probe laser input unit; and
a coupling laser arranged to direct a coupling laser beam into the coupling laser input port;
wherein a predetermined one the two aforesaid lasers are arranged to operate with differing wavelengths; and
wherein the coupling laser is adapted to modulate its output intensity in response to a modulation signal, or the coupling laser is provided with a modulator adapted to modulate the intensity of the coupling laser input beam, into the coupling laser input port.

17. The Rydberg sensor unit of claim 16, wherein one of the lasers is arranged to operate with a wavelength of from 700 to 900 nm, and the other with a wavelength of from 300 to 600 nm.

18. The Rydberg sensor unit of claim 16, wherein the coupling laser input unit is provided with optical filters between each optical prism of a set of optical prisms of the row thereof, arranged to transmit light from the coupling laser, but to block light from the probe laser.

* * * * *